(12) United States Patent
Schmidt

(10) Patent No.: US 9,886,792 B2
(45) Date of Patent: Feb. 6, 2018

(54) ADAPTIVE MESH REFINEMENT

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 528 days.

(21) Appl. No.: 13/893,191

(22) Filed: May 13, 2013

(65) Prior Publication Data

US 2013/0300741 A1 Nov. 14, 2013

Related U.S. Application Data

(60) Provisional application No. 61/646,603, filed on May 14, 2012.

(51) Int. Cl.
*G06T 17/20* (2006.01)
*G06T 19/20* (2011.01)

(52) U.S. Cl.
CPC ............. *G06T 17/20* (2013.01); *G06T 19/20* (2013.01)

(58) Field of Classification Search
CPC .......... G06T 17/20; G06T 19/20; G06T 19/00
USPC ........................................................ 345/420
See application file for complete search history.

(56) References Cited

U.S. PATENT DOCUMENTS

| | | | |
|---|---|---|---|
| 5,886,702 A * | 3/1999 | Migdal et al. | 345/423 |
| 6,169,549 B1 * | 1/2001 | Burr | 345/419 |
| 6,693,631 B2 * | 2/2004 | Hubeli et al. | 345/420 |
| 7,228,191 B2 | 6/2007 | Hofmeister et al. | |
| 2006/0164415 A1 * | 7/2006 | Smith | G06T 17/205 345/423 |
| 2006/0290693 A1 * | 12/2006 | Zhou et al. | 345/420 |
| 2006/0290695 A1 | 12/2006 | Salomie | |
| 2007/0165025 A1 * | 7/2007 | Shen et al. | 345/423 |
| 2009/0177454 A1 | 7/2009 | Bronstein | |
| 2010/0226589 A1 | 9/2010 | Mukherjee | |
| 2011/0050691 A1 * | 3/2011 | Hamedi et al. | 345/420 |
| 2012/0120074 A1 | 5/2012 | Huysmans et al. | |
| 2012/0215510 A1 * | 8/2012 | Metaxas | 703/9 |

OTHER PUBLICATIONS

Non-Final Office Action for U.S. Appl. No. 13/893,198, dated Jul. 29, 2015, 20 pages.
Menci et al. Improved Laplacian Smoothing of Noisy Surface Meshes, 1999, Eurographics, vol. 18 (1999), No. 3, pp. 1-8.
Non-Final Office Action for U.S. Appl. No. 13/893,198, dated Sep. 28, 2016, 20 pages.
Non-Final Office Action for U.S. Appl. No. 13/893,196, dated Jul. 28, 2015, 16 pages.

(Continued)

*Primary Examiner* — Yuehan Wang
(74) *Attorney, Agent, or Firm* — Artegis Law Group, LLP

(57) ABSTRACT

One embodiment of the present invention sets forth a technique for mesh refinement. The technique involves receiving a mesh including a plurality of triangles. The technique further involves processing the mesh to generate a refined mesh by performing an edge flip operation on the mesh, performing an edge split operation on the mesh, and performing an edge collapse operation on the mesh.

22 Claims, 15 Drawing Sheets

(56) References Cited

OTHER PUBLICATIONS

Rocchini et al., The Marching Intersections algorithm for merging range images, Mar. 4, 2004, The Visual Computer (2004) 20:149-164, pp. 149-164.
Non-Final Office Action for U.S. Appl. No. 13/893,194, dated Oct. 12, 2016, 22 pages.
Sharf et al., SnapPaste: An Interactive Technique for easy Mesh Composition, Aug. 25, 2006, Visual Comput (2006) 22:835-844.
Non-Final Office Action for U.S. Appl. No. 13/892,750, dated May 4, 2015, 17 pages.
Non-Final Office Action for U.S. Appl. No. 13/892,750, dated Sep. 6, 2016, 19 pages.
Final Office Action for U.S. Appl. No. 13/893,198, dated Dec. 30, 2015, 20 pages.
Andre, Lecture 7—Meshing, 2006, Fluent Inc., p. 1-35.
Bloomenthal et al., Polygonization of Non-Manifold Implicit Surfaces, 1995, SIGGRAPH '95 Proceeding of the 22nd annual conference on Computer Graphic and interactive techniques, pp. 309-316.
Turk et al., Zippered Polygon Meshes from Range Images, 1994, ACM 1994 ISBN: 0-89791-667-0, pp. 1-8.
Tyson Brochu, Essex Edwards, and Robert Bridson: Efficient Geometrically Exact Continuous Collision Detection. ACM Transactions on Graphics (TOG), vol. 31, No. 4 Date: Jul. 1, 2012 Publisher: ACM Place: New York, NY, USA.†

\* cited by examiner
† cited by third party

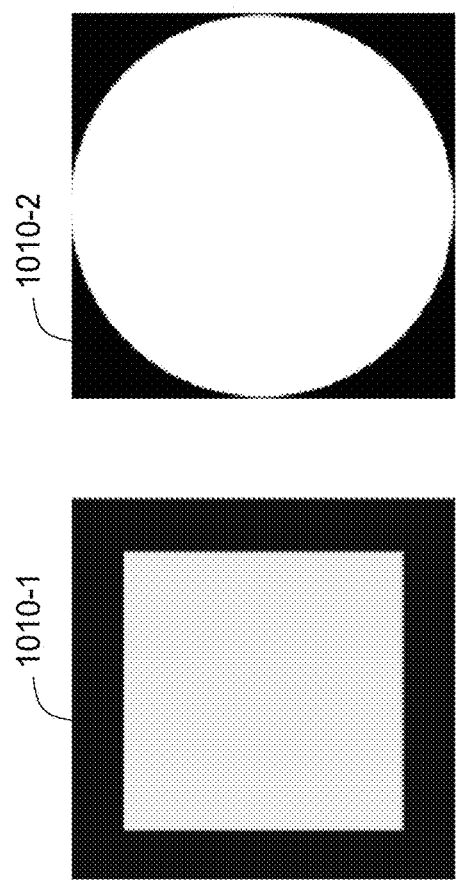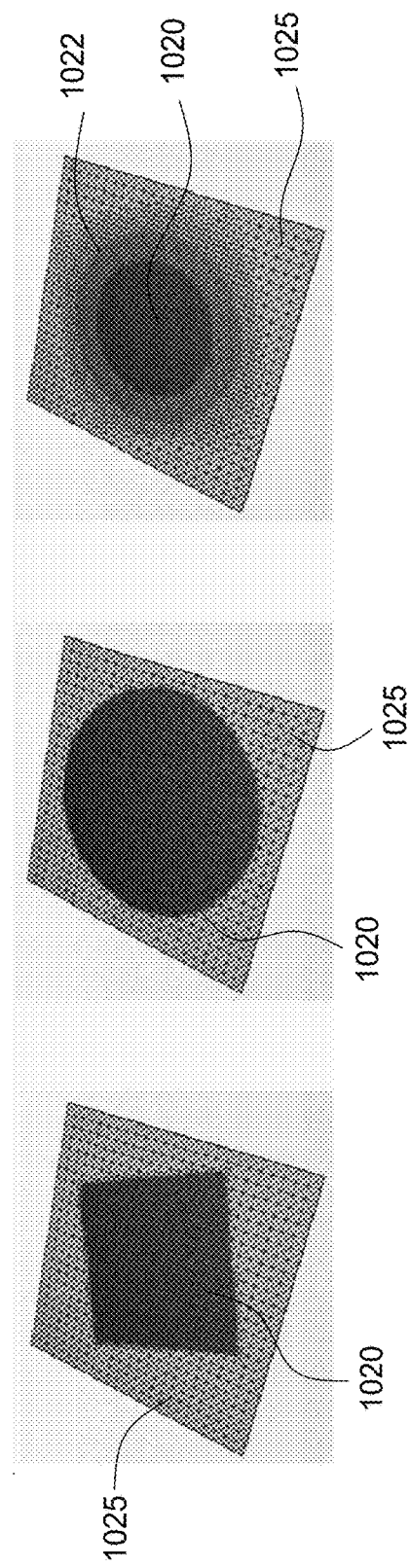

ADAPTIVE MESH REFINEMENT

CROSS-REFERENCE TO RELATED APPLICATIONS

This application claims benefit of U.S. Provisional Patent Application Ser. No. 61/646,603, filed May 14, 2012, which is hereby incorporated herein by reference.

BACKGROUND OF THE INVENTION

Field of the Invention

Embodiments of the present invention generally relate to computer-aided design (CAD) and, more specifically, to adaptive mesh refinement.

Description of the Related Art

A wide variety of graphics-oriented software applications are currently available to end-users, including computer-aided design (CAD) applications, computer graphics applications, and three-dimensional (3D) modeling applications, among others. Many of these software applications allow an end-user to create and modify 2D and/or 3D graphics designs. For example, an end-user may interact with a 3D modeling application to add geometry to a design, remove geometry from a design, extrude portions of the design, or join two or more designs. Such operations typically are performed by modifying a mesh of primitives (e.g., triangles) included in the design. However, such operations oftentimes introduce distortions and irregularities into the mesh. For example, extruding or displacing a region of a mesh can affect triangles in and around the region, producing triangles having irregular shapes, sizes, angles, etc.

Conventionally, the end-user must manually repair mesh triangles to correct mesh distortions and irregularities. However, manually repairing mesh triangles can be tedious and time-consuming for the end-user. Moreover, even after attempting repairs of distortions, modified regions of the design often include a twisted mesh of irregular triangles having undesirable characteristics (e.g., large opening angles). Such irregularities may produce numerical and computational issues and/or produce visual artifacts during subsequent processing of the mesh.

As the foregoing illustrates, there is a need in the art for a more effective way to enable application end-users to repair triangle mesh distortions and irregularities.

SUMMARY OF THE INVENTION

One embodiment of the present invention sets forth a method for refining a mesh of primitives. The method involves receiving a mesh that includes a plurality of triangles and processing the mesh to generate a refined mesh. The mesh is processed by performing an edge flip operation on the mesh, performing an edge split operation on the mesh, and performing an edge collapse operation on the mesh.

Further embodiments provide a non-transitory computer-readable storage medium and a computing device to carry out at least the method steps set forth above.

Advantageously, the disclosed technique allows a user to repair triangle mesh distortions and irregularities by iteratively performing one or more edge operator passes (e.g., edge flip pass, edge split pass, edge collapse pass), one or more vertex collapse passes, and/or one or more smoothing passes. These refinement passes can be applied locally to one or more regions of the mesh, for example, by using a brush tool and/or based on a weighting function. The disclosed technique, among other things, enables users to more efficiently repair and correct mesh irregularities, reducing the incidence of computational issues and/or visual artifacts during subsequent processing of the mesh.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 10A-10F illustrate refinement weight masks and mesh refinements performed using the refinement weight masks, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
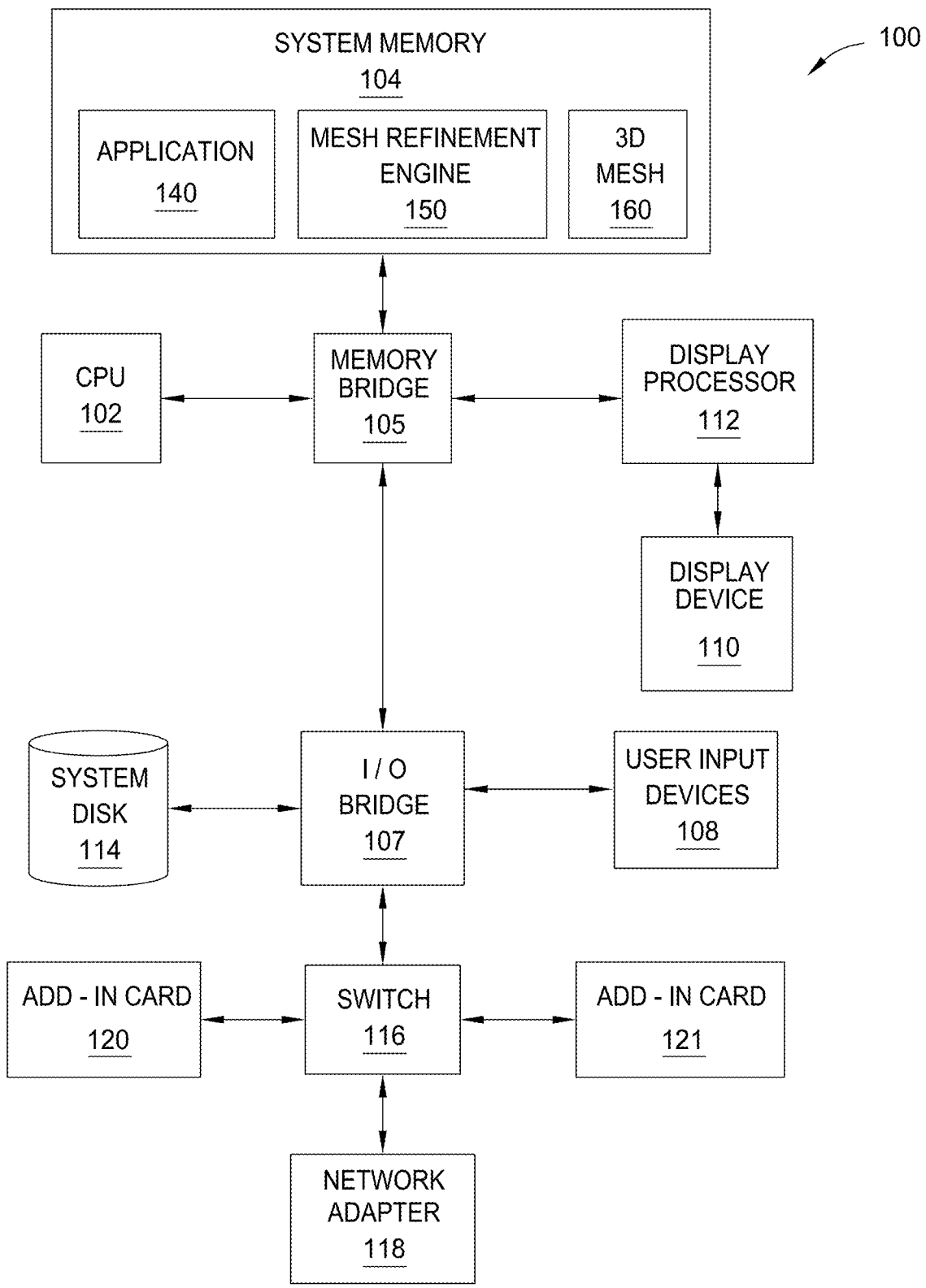
FIG. 1 illustrates a computing device configured to implement one or more aspects of the present invention.

FIG. 1 illustrates a computing device 100 configured to implement one or more aspects of the present invention. As shown, computing device 100 includes a memory bridge 105 that connects a central processing unit (CPU) 102, an input/output (I/O) bridge 107, a system memory 104, and a display processor 112.

Computing device 100 may be a computer workstation, a personal computer, video game console, personal digital assistant, mobile phone, mobile device or any other device suitable for practicing one or more embodiments of the present invention. As shown, the central processing unit (CPU) 102 and the system memory 104 communicate via a bus path that may include a memory bridge 105. CPU 102 includes one or more processing cores, and, in operation, CPU 102 is the master processor of computing device 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., conventional cathode ray tube, liquid crystal display, light-emitting diode, plasma, organic light-emitting diode, or surface-conduction electron-emitter based display). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network and may include wired or wireless communication over local area networks and wide area networks, such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

In one embodiment, application 140, mesh refinement engine 150, and 3D mesh 160 are stored in system memory 104. Although FIG. 1 shows the mesh refinement engine 150 as a separate software module, the mesh refinement engine 150 may be integrated into the application 140 or offered as a software add-on or plug-in for the application 140. Application 140 may be a CAD (computer aided design) application program configured to generate and display graphics data included in the 3D mesh 160 on display device 110. For example, the 3D mesh 160 could define one or more graphics objects that represent a 3D model designed using the CAD system or a character for an animation application program.

The mesh refinement engine 150 is configured to modify a mesh (e.g., 3D mesh 160) by performing one or more refinement operations on the mesh. The refinement operations may be applied to add, remove, replace, shift, etc. vertices and/or edges included in the mesh. For example, an edge operation may be performed on the mesh to add an edge (e.g., a triangle edge) to the mesh, remove an edge from the mesh, and/or shift the position of an edge in the mesh. Additionally, a vertex operation may be performed to add a vertex to the mesh, remove a vertex from the mesh, and/or shift the position of a vertex in the mesh. Other types of refinement operations, such as smoothing operations, also may be performed to improve the visual appearance of a mesh.

The mesh refinement engine 150 enables a user to iteratively refine a mesh, for example, by repairing mesh distortions produced when adding geometry to a mesh, removing geometry from a mesh, modifying the geometry of a mesh, and the like. For example, displacing a region of a mesh may stretch and distort the regions of the mesh, producing mesh triangles having irregular sizes and angles near the displaced region. Such irregularities may produce computational issues and/or visual artifacts during subsequent processing of the mesh. However, by performing mesh refinement operations before, during, and/or after the displacement process, mesh distortions may be reduced or eliminated. Various mesh refinement operations are described below with respect to FIGS. 2-4.

Figure 2:
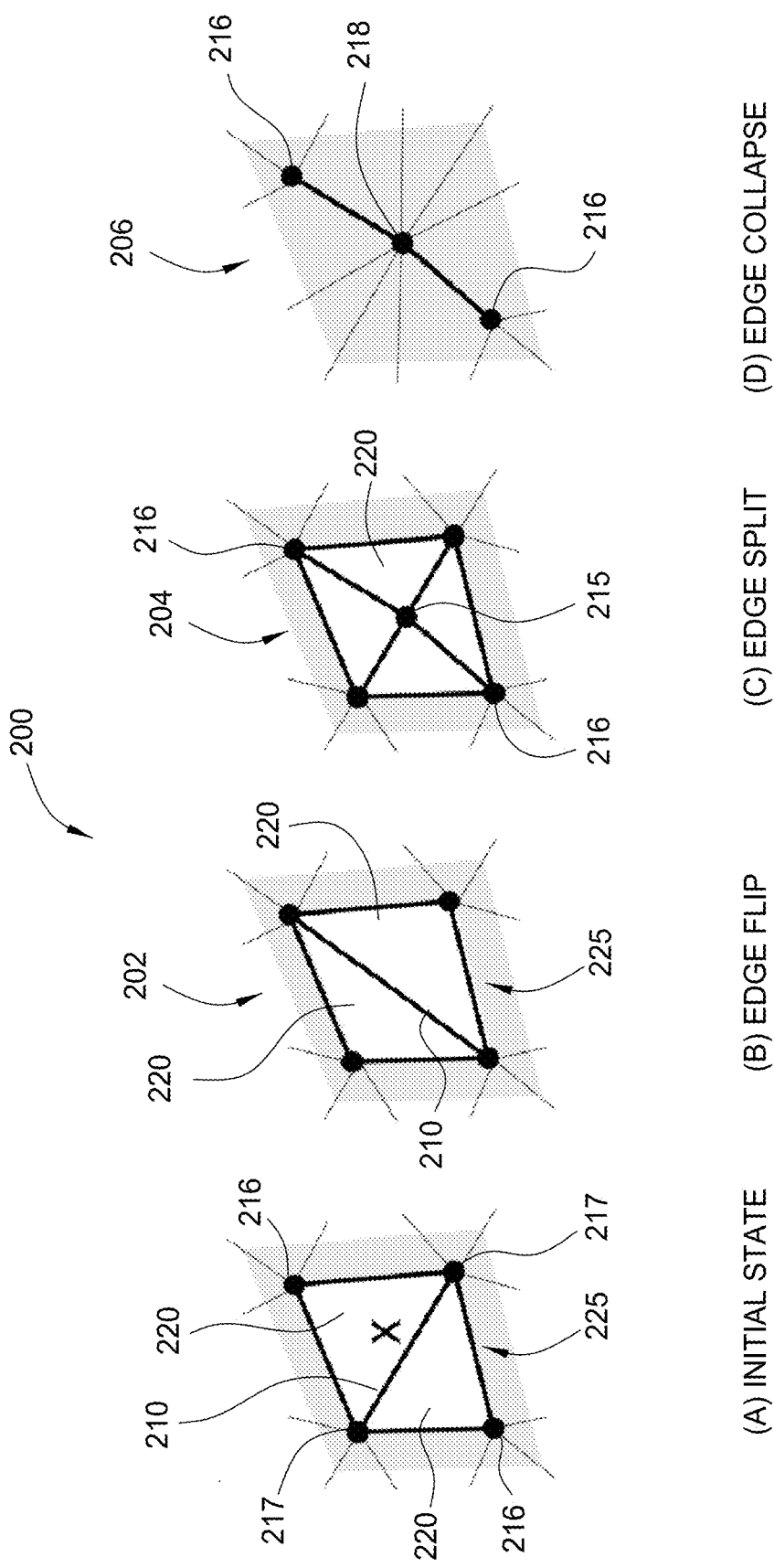
FIG. 2 illustrates edge operations for refining a 3D mesh, according to one embodiment of the present invention.

FIG. 2 illustrates edge operations 200 for refining a mesh, according to one embodiment of the present invention. Edge operations 200 may be performed on a mesh to add an edge, remove an edge, and/or shift the position of an edge. Edge operations 200 may be applied to a mesh on a per-edge basis, or multiple edges may be processed in parallel.

As shown, the edge operations 200 include an edge flip operation 202, an edge split operation 204, and an edge collapse operation 206. An edge flip operation 202 is performed to rotate an edge 210 within the quadrilateral 225 formed by the two triangles 220 connected to the edge 210. An edge split operation 204 is performed to replace the two triangles 220 connected to the edge 210 with four triangles 220 by inserting a vertex 215 into the edge 210 and connecting the vertex 215 to the two vertices 216 opposite the edge 210. An edge collapse operation 206 removes the triangles 220 connected to the edge 210 and shifts the vertices 217 connected to the edge 210 to a new vertex position 218 (e.g., a midpoint of the initial edge 210). Conditions under which these edge operations 200 may be performed are described in further detail below with respect to FIGS. 6-8.

Figure 3:
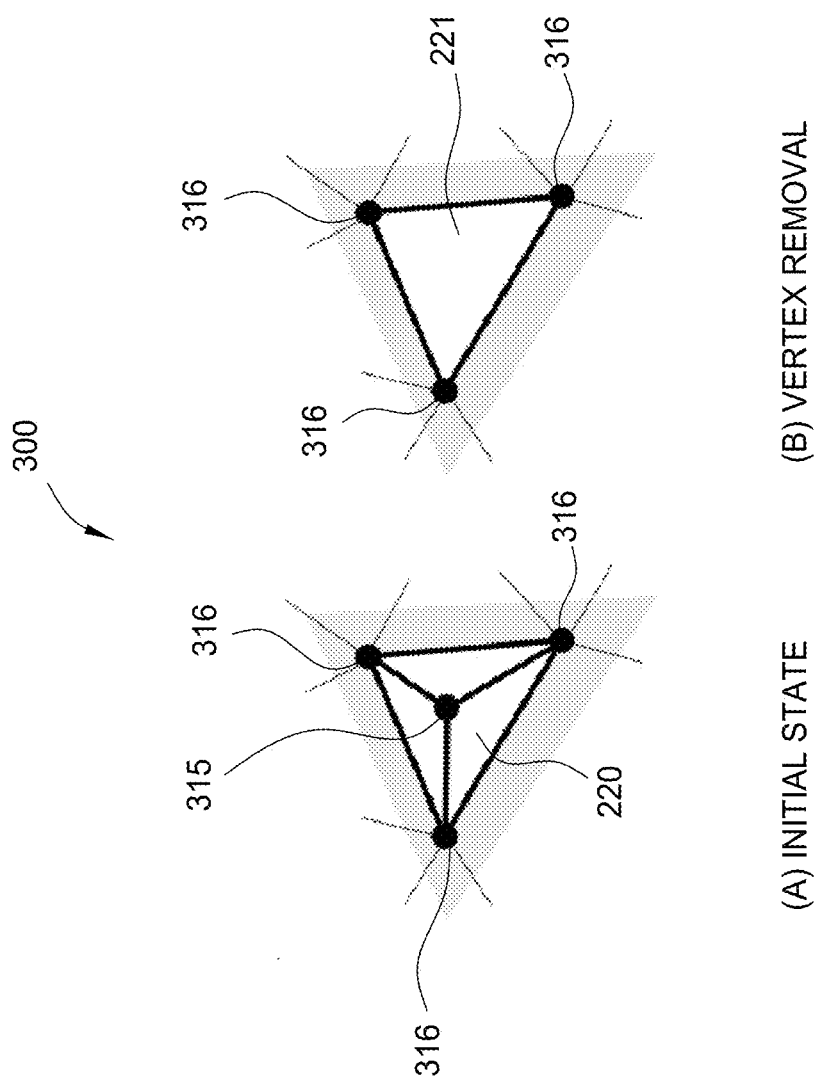
FIG. 3 illustrates a vertex removal operation for refining a 3D mesh, according to one embodiment of the present invention.

FIG. 3 illustrates a vertex removal operation 300 for refining a mesh, according to one embodiment of the present invention. The vertex removal operation 300 may be applied to a mesh on a per-vertex basis, or multiple vertices may be processed in parallel. The vertex removal operation 300 may be performed to remove a vertex 315 connected to only three neighboring vertices 316 (i.e., a vertex 315 having a valence of three), also known as a tip vertex. Tip vertices 315 are necessarily surrounded by triangles 220 having large opening angles and, thus, may cause computational issues during subsequent processing of a mesh. Additionally, tip vertices 315 may collapse into the plane of their surrounding vertices 316 (e.g., when applying smoothing algorithms) and, as a result, may add little or no detail to the mesh. Consequently, to avoid such issues, tip vertices 315 may be removed via a vertex removal operation 300. After removal of a tip vertex 315, a new triangle 221 may be added to the mesh. Conditions under which a vertex removal operation 300 may be performed are described in further detail below with respect to FIG. 9.

Figure 4:
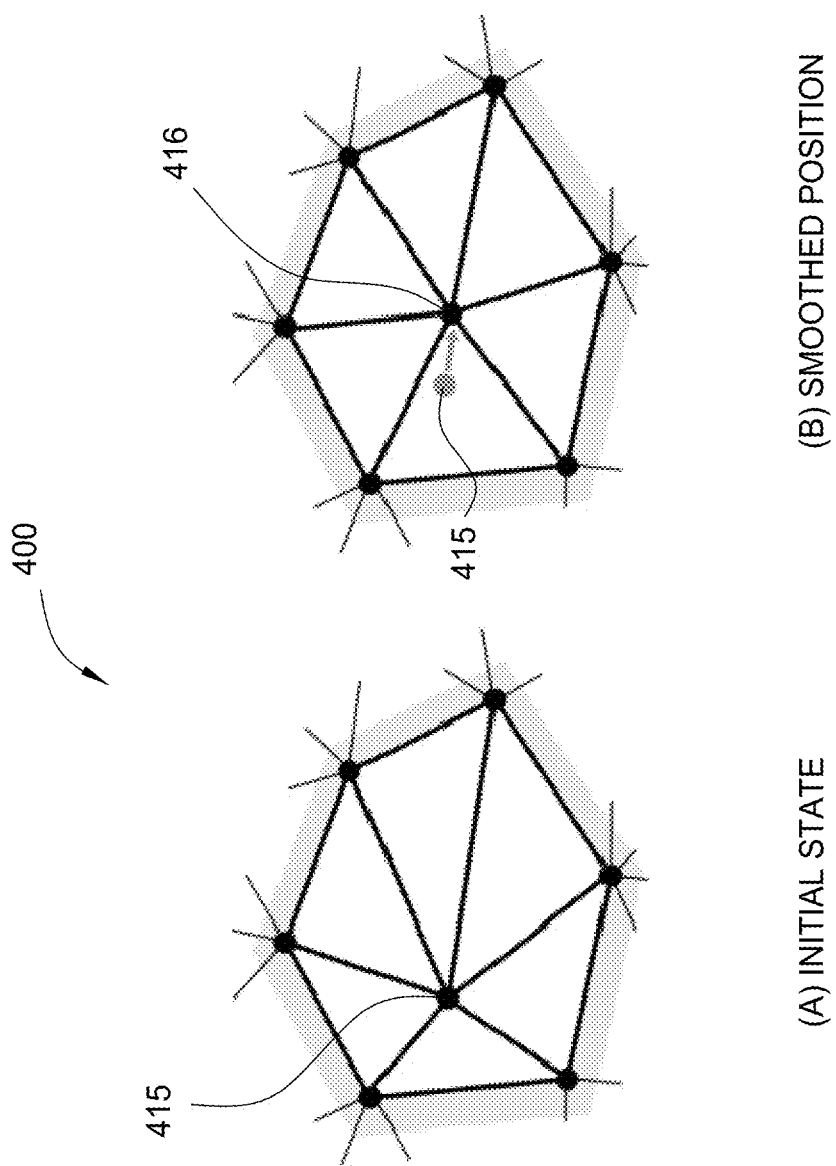
FIG. 4 illustrates a smoothing operation for refining a 3D mesh, according to one embodiment of the present invention.

FIG. 4 illustrates a smoothing operation 400 for refining a 3D mesh, according to one embodiment of the present invention. The smoothing operation 400 may be performed to more evenly distribute vertices in the mesh. In addition to improving the overall visual appearance of the mesh, the smoothing operation may be performed to reduce the number of small, irregularly-sized triangles that occur along mesh boundaries. Such triangles may be generated when edge operations are performed along preserved boundaries.

As shown, the smoothing operation 400 may shift a vertex 415 from an initial position to a smoothed vertex position 416. The location of the smoothed vertex position 416 may be based on a smoothing algorithm (e.g., a Laplacian smoothing algorithm) and a smoothing strength factor. Additional details regarding the smoothing operation 400 are described below with respect to FIG. 10.

Figure 5:
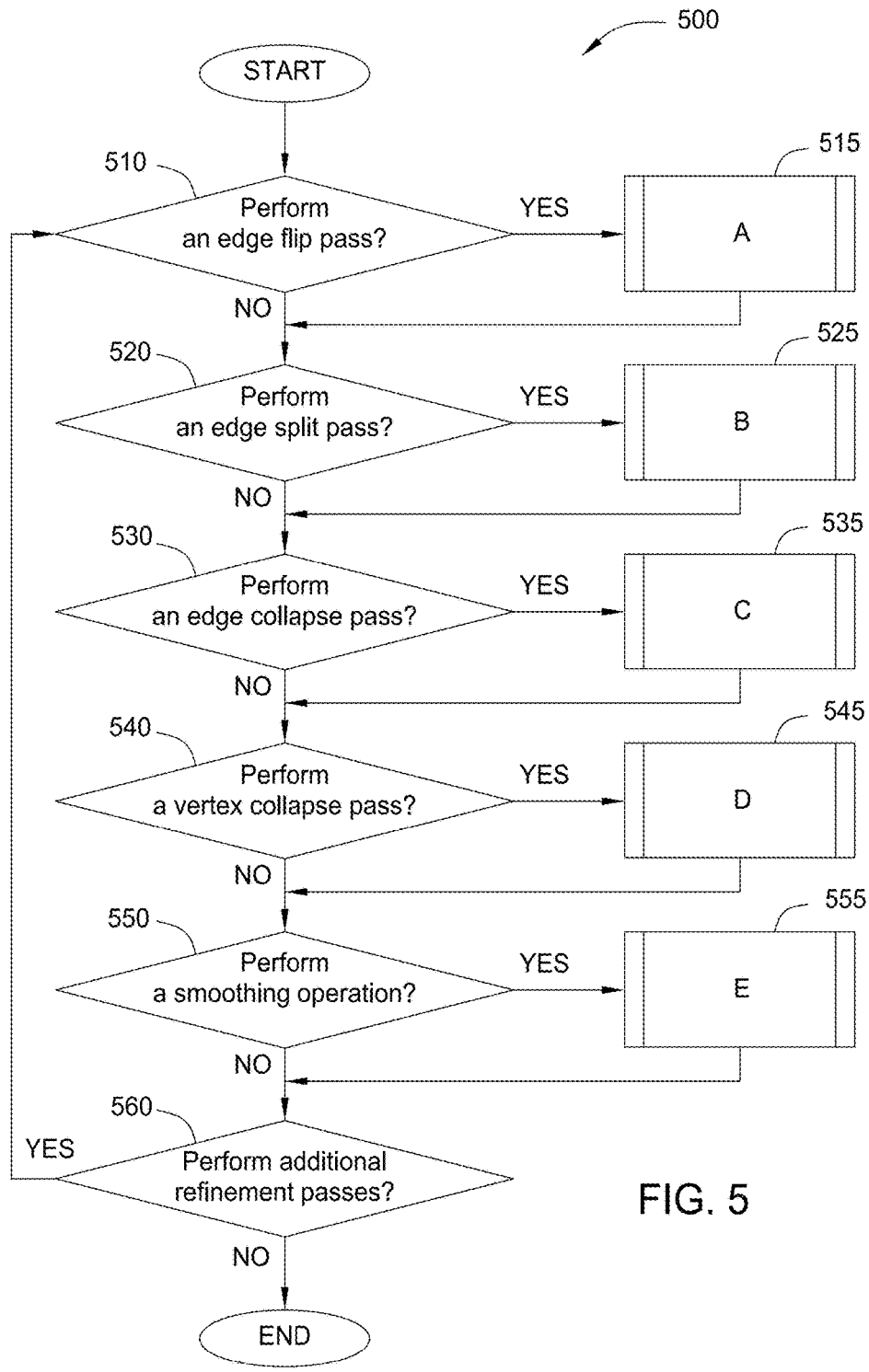
FIG. 5 is a flow diagram of method steps for refining a mesh of primitives, according to one embodiment of the present invention.

FIG. 5 is a flow diagram of method steps for refining a mesh of primitives, according to one embodiment of the present invention. Although the method steps are described in conjunction with the system of FIG. 1, persons skilled in the art will understand that any system configured to perform the method steps, in any order, falls within the scope of the present invention. Further, although mesh refinement operations are described as being performed in a particular order, the mesh refinement operations may be reordered and/or various mesh refinement operations may be repeated or omitted.

As shown, a method 500 begins at step 510, where the mesh refinement engine 150 determines whether to perform an edge flip pass on one or more edges 210 included in a mesh. During the edge flip pass, the mesh refinement engine 150 processes the edge(s) 210 to determine whether an edge flip operation 202 should be performed on the edge(s) 210. If the mesh refinement engine 150 determines that an edge flip pass should be performed, then subprocess A is executed at step 515. At step 520, the mesh refinement engine 150 determines whether to perform an edge split pass on one or more edges 210 included in a mesh (e.g., to determine whether an edge split operation 204 should be performed on the edge(s) 210). If the mesh refinement engine 150 determines that an edge split pass should be performed, then subprocess B is executed at step 525. At step 530, the mesh refinement engine 150 determines whether to perform an edge collapse pass on one or more edges 210 included in a mesh (e.g., to determine whether an edge collapse operation 206 should be performed on the edge(s) 210). If the mesh refinement engine 150 determines that an edge collapse pass should be performed, then subprocess C is executed at step 535. The details of subprocesses A, B and C are described below in FIGS. 6-8, respectively. As discussed above, the edge flip pass, edge split pass, and edge collapse pass may be performed in any order and/or one or more of the passes may be repeated or omitted.

At step 540, the mesh refinement engine 150 determines whether to perform a vertex collapse pass on one or more vertices 315 included in a mesh (e.g., to determine whether a vertex collapse operation 300 should be performed on the vertices 315). If the mesh refinement engine 150 determines that a vertex collapse pass should be performed, then subprocess D is executed at step 545. At step 550, the mesh refinement engine 150 determines whether to perform a smoothing operation 400 on one or more vertices 415 included in a mesh. If the mesh refinement engine 150 determines that a smoothing operation 400 should be performed, then subprocess E is executed at step 555. The details of subprocesses D and E are described below in FIGS. 9 and 10, respectively.

Finally, at step 560, the mesh refinement engine 150 determines whether to perform additional mesh refinement passes. If the mesh refinement engine 150 determines that additional refinement passes should be performed, then the method returns to step 510. Alternatively, upon determining that additional refinement passes should be performed, the method may return to any of step 510, step 520, step 530, step 540, and/or step 550. Furthermore, the flow diagram may be traversed such that one or more of the edge operations 200 are performed before and/or after the vertex collapse operation 300 and/or the smoothing operation 400.

Figure 6:
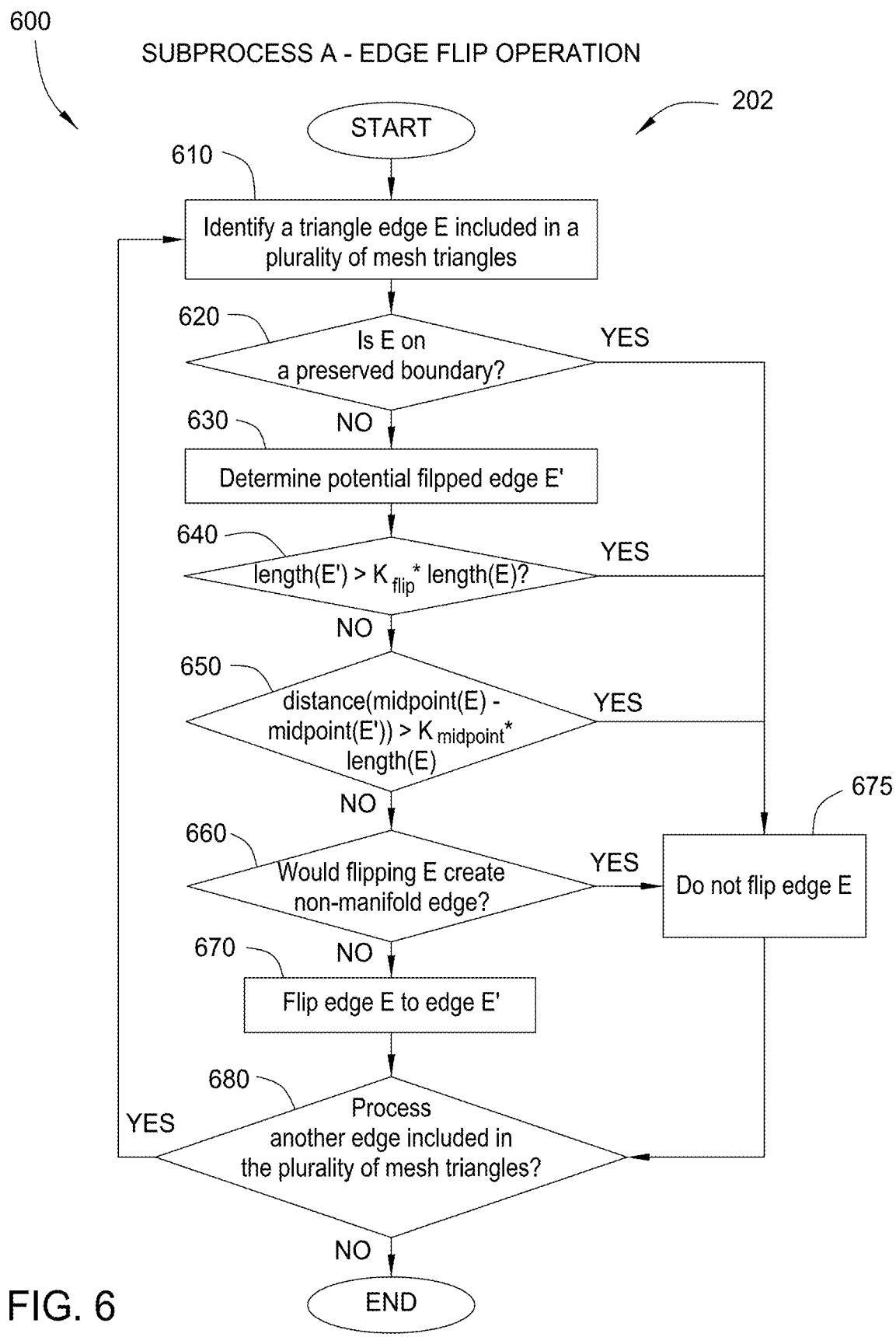
FIG. 6 is a flow diagram of method steps for performing an edge flip operation on a mesh, according to one embodiment of the present invention.

FIG. 6 is a flow diagram of method steps for performing an edge flip operation 202 on a mesh, according to one embodiment of the present invention. Although the method steps are described in conjunction with the system of FIG. 1, persons skilled in the art will understand that any system configured to perform the method steps, in any order, falls within the scope of the present invention.

As shown, a method 600 begins at step 610, where the mesh refinement engine 150 identifies a triangle edge 210 included in a mesh. At step 620, the mesh refinement engine 150 optionally determines whether the edge 210 is on a preserved boundary of the mesh. A preserved boundary may include a limit (e.g., an outermost perimeter) of the mesh itself and/or a boundary selected by a user or generated by the mesh refinement engine 150. For example, the user may select a region of interest (ROI) in which mesh refinement operations are to be performed. Upon selecting the ROI, the user may further determine whether mesh refinement operations performed within the ROI are permitted to affect regions of the mesh that are outside of the ROI (e.g., in proximity to the ROI). If the mesh refinement operations are permitted to affect regions of the mesh outside of the ROI, then triangles adjacent or proximate to the ROI may be modified when performing mesh refinement operations. If the mesh refinement operations are not permitted to affect regions of the mesh outside of the ROI (i.e., the ROI boundary is a preserved boundary), then the position, shape, etc. of the ROI boundary may be retained, and triangles outside of the ROI are not modified when performing mesh refinement operations. Additionally, the user may pin one or more locations along the ROI boundary to prevent the mesh refinement engine 150 from modifying the position and shape of vertices and triangles at the pinned locations while allowing the mesh refinement engine 150 to modify other (e.g., unpinned) locations along the ROI boundary.

If the edge 210 is located on a preserved boundary (e.g., an ROI boundary, perimeter of the mesh, etc.), then the mesh refinement engine 150 determines not to flip the edge 210 at step 675. As such, the preserved boundary is not modified. If the edge 210 is not located on a preserved boundary, then the mesh refinement engine 150 determines a potential flipped edge 210 at step 630.

Next, at step 640, the mesh refinement engine 150 computes the length of the flipped edge 210 and compares this length to the product of a flip threshold $K_{flip}$ and the length of the initial edge 210. If the length of the flipped edge 210 is greater than the product of the flip threshold $K_{flip}$ and the length of the initial edge 210, then the mesh refinement engine 150 determines not to flip the edge 210 at step 675. If the length of the flipped edge 210 is not greater than the product of the flip threshold $K_{flip}$ and the length of the initial edge 210, then the method 600 proceeds to step 650. The flip threshold $K_{flip}$ is intended to reduce the occurrence of edge flips that do not significantly improve mesh quality. For example, by setting the flip threshold $K_{flip}$ to a value of 0.9, an edge 210 is flipped only if the flipped edge 210 is appreciably shorter than the initial edge 210. Other values for the flip threshold $K_{flip}$ (e.g., 0.95, 0.8, 0.75, etc.) may be selected as well.

At step 650, a distance between the midpoint of the initial edge 210 and the midpoint of the flipped edge 210 is determined, and the distance is compared to the product of the midpoint threshold $K_{midpoint}$ and the length of the initial edge 210. If the distance is greater than the product of the midpoint threshold $K_{midpoint}$ and the length of the initial edge 210, then the mesh refinement engine 150 determines not to flip the edge 210 at step 675. If the distance is not greater than the product of the midpoint threshold $K_{midpoint}$ and the length of the initial edge 210, then the method 600 proceeds to step 660. The midpoint threshold $K_{midpoint}$ is intended to reduce the occurrence of edge flips that significantly change the shape of the mesh. For example, by setting the midpoint threshold $K_{midpoint}$ to a value of 0.2, an edge 210 is flipped only if the flipped edge 210 is in a plane that is near the plane in which the initial edge 210 resides. Other values for the midpoint threshold $K_{midpoint}$ (e.g., 0.1, 0.3, etc.) may be selected as well.

Next, at step 660, the mesh refinement engine 150 determines whether flipping the edge 210 would create a non-manifold edge. A non-manifold edge may be defined as an edge that is shared by more than two faces (e.g., an edge shared by more than two triangles). If flipping the edge 210 would create a non-manifold edge, then the mesh refinement engine 150 determines not to flip the edge 210 at step 675. If flipping the edge 210 would not create a non-manifold edge, then the mesh refinement engine 150 flips the edge 210 at step 670. Finally, at step 680, the mesh refinement engine 150 determines whether to process another edge 210 included in the mesh. If another edge 210 is to be processed by the mesh refinement engine 150, then the method returns to step 610, where another edge 210 included in the mesh is identified.

Figure 7:
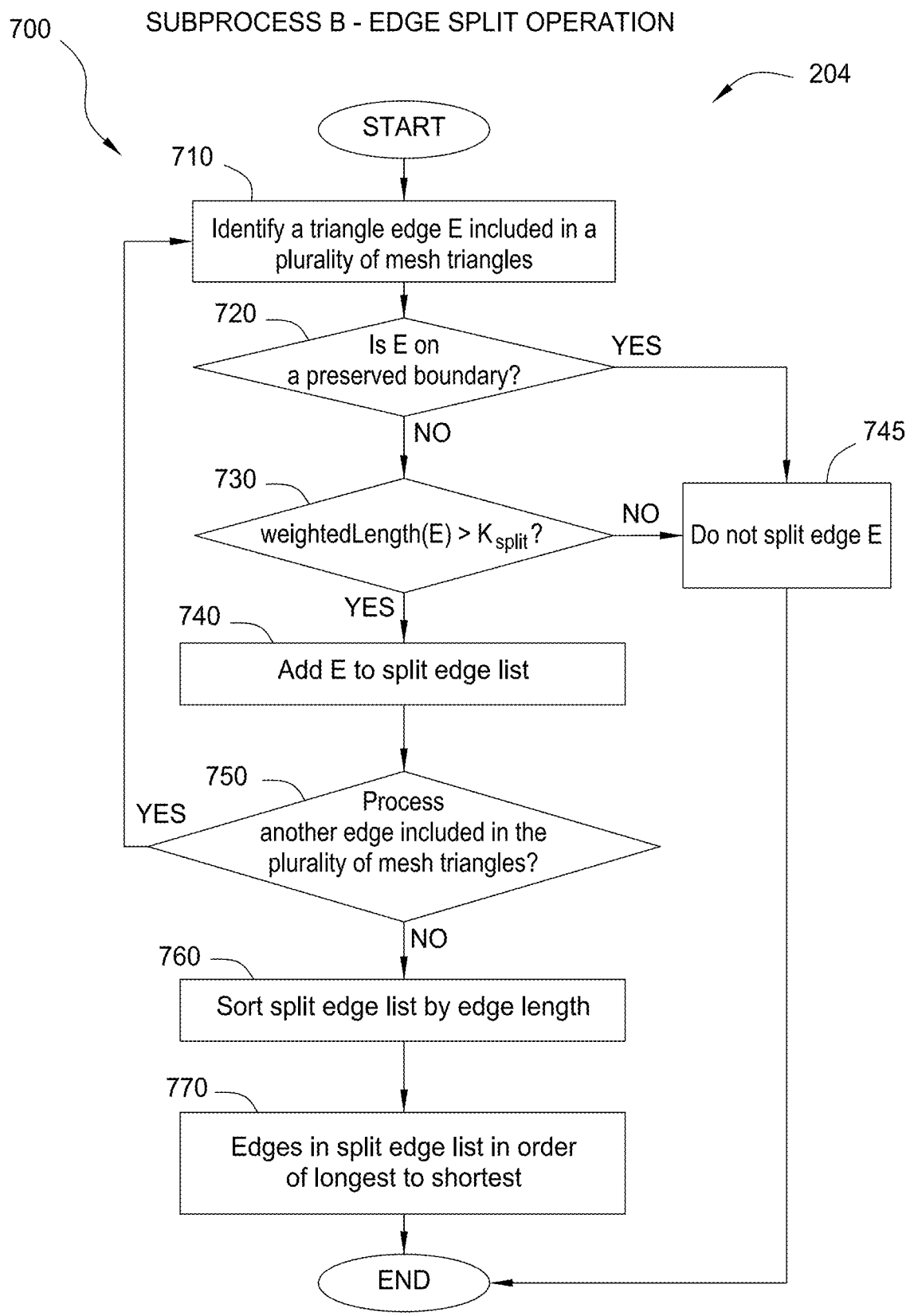
FIG. 7 is a flow diagram of method steps for performing an edge split operation on a mesh, according to one embodiment of the present invention.

FIG. 7 is a flow diagram of method steps for performing an edge split operation 204 on a mesh, according to one embodiment of the present invention. Although the method steps are described in conjunction with the system of FIG. 1, persons skilled in the art will understand that any system configured to perform the method steps, in any order, falls within the scope of the present invention.

As shown, a method 700 begins at step 710, where the mesh refinement engine 150 identifies a triangle edge 210 included in a mesh. At step 720, the mesh refinement engine 150 optionally determines whether the edge 210 is on a preserved boundary of the mesh. If the edge 210 is located on a preserved boundary (e.g., an ROI boundary, perimeter of the mesh, etc.), then the mesh refinement engine 150 determines not to split the edge 210 at step 745.

If the edge 210 is not located on a preserved boundary, then the mesh refinement engine 150 compares a weighted length of the edge 210 to a split threshold $K_{split}$ at step 730. If the weighted length of the edge 210 is not greater than the split threshold $K_{split}$, then the mesh refinement engine 150 determines not to split the edge 210 at step 745. If the weighted length of the edge 210 is greater than the split threshold $K_{split}$, then the mesh refinement engine 150 adds the edge 210 to a split edge list at step 740. The split threshold split threshold $K_{split}$ may be defined as the target maximum edge length. That is, by performing the comparison in step 730, at the end of an edge split pass, all processed edges 210 may be shorter than the split threshold $K_{split}$ length. The weighting applied to the length of the edge 210 may be based on the per-vertex refinement weights assigned to the two vertices 217 to which the edge 210 is connected. The per-vertex refinement weights may be assigned to vertices by the mesh refinement engine 150, or the per-vertex refinement weights may be based on user selection (e.g., based on a weight refinement mask), as described in further detail with respect to FIGS. 10A-10F and 11A-11D.

Next, at step 750, the mesh refinement engine 150 determines whether to process another edge 210 included in the mesh. If another edge 210 is to be processed by the mesh refinement engine 150, then the method returns to step 710, where another edge 210 included in the mesh is identified. If no additional edges 210 are to be processed, then the edge(s) 210 included in the split edge list are optionally sorted by length at step 760. Finally, the edge(s) 210 included in the split edge list are split at step 770. If the edges 210 were sorted at step 760, then the edges 210 included in the split edge list may be split in order of longest edge length to shortest edge length.

Figure 8:
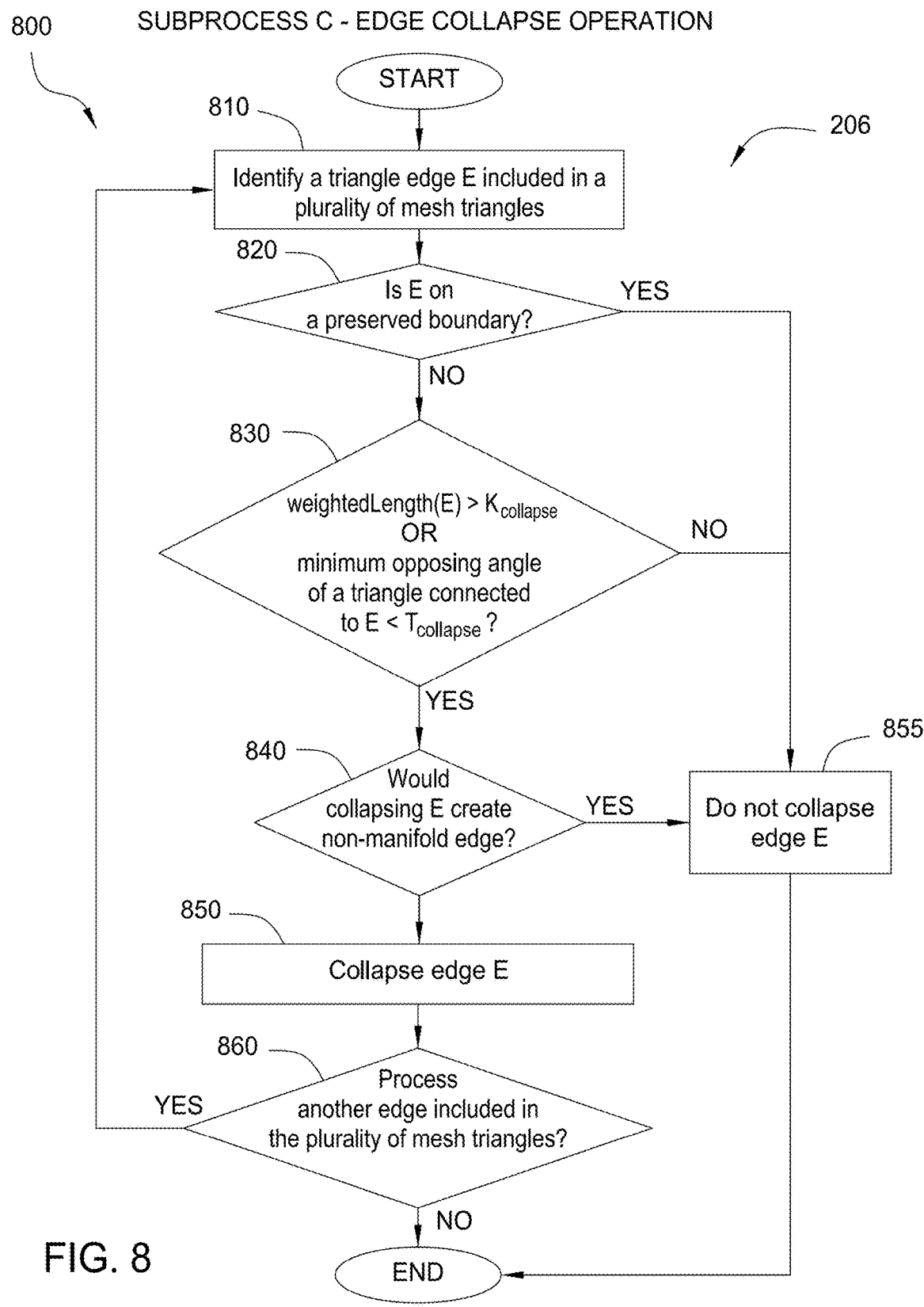
FIG. 8 is a flow diagram of method steps for performing an edge collapse operation on a mesh, according to one embodiment of the present invention.

FIG. 8 is a flow diagram of method steps for performing an edge collapse operation 206 on a mesh, according to one embodiment of the present invention. Although the method steps are described in conjunction with the system of FIG. 1, persons skilled in the art will understand that any system configured to perform the method steps, in any order, falls within the scope of the present invention.

As shown, a method 800 begins at step 810, where the mesh refinement engine 150 identifies a triangle edge 210 included in a mesh. At step 820, the mesh refinement engine 150 optionally determines whether the edge 210 is on a preserved boundary of the mesh. If the edge 210 is located on a preserved boundary (e.g., an ROI boundary, perimeter of the mesh, etc.), then the mesh refinement engine 150 determines not to collapse the edge 210 at step 855. If the edge 210 is not located on a preserved boundary, then the mesh refinement engine 150 next determines whether at least one of two inequalities are satisfied at step 830. With reference to the first inequality, the mesh refinement engine 150 determines whether a weighted length (e.g., based on per-vertex refinement weights described below) of the edge 210 is greater than a collapse threshold $K_{collapse}$. The collapse threshold $K_{collapse}$ is intended to collapse edges 210 that are shorter than the value assigned to this threshold. With reference to the second inequality, the mesh refinement engine 150 determines whether a minimum opposing angle of one of the two triangles connected to the edge 210 is less than a target angle $T_{collapse}$. The target angle $T_{collapse}$ is intended to collapse triangles 220 having an angle that is less than the value assigned to this target. Thus, after an edge collapse pass, all angles included in the processed triangles 220 may be greater than the target angle $T_{collapse}$. Furthermore, because this criterion is scale-independent (e.g., the target angle $T_{collapse}$ does not depend on the relative size of triangles in the mesh), mesh quality may be significantly improved even if $K_{collapse}$ is assigned an inappropriate value.

If one or both of the first inequality and second inequality are satisfied, the mesh refinement engine 150 then determines whether collapsing the edge 210 would create a non-manifold edge at step 840. If collapsing the edge 210 would create a non-manifold edge, then the mesh refinement engine 150 determines not to collapse the edge 210 at step 855. If collapsing the edge 210 would not create a non-manifold edge, then the mesh refinement engine 150 collapses the edge 210 at step 850. Finally, at step 860, the mesh refinement engine 150 determines whether to process another edge 210 included in the mesh. If another edge 210 is to be processed by the mesh refinement engine 150, then the method returns to step 810, where another edge 210 included in the mesh is identified.

Figure 9:
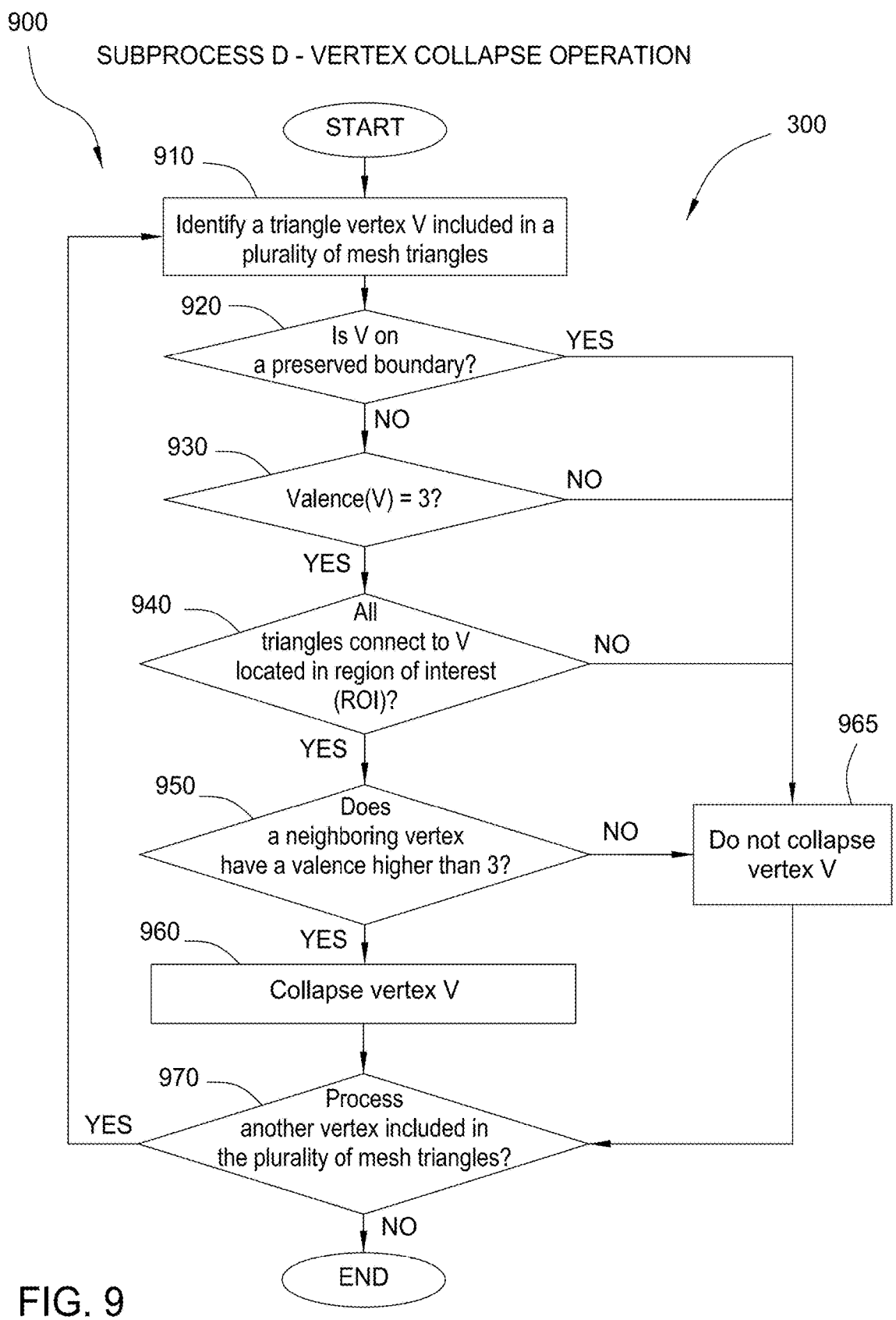
FIG. 9 is a flow diagram of method steps for performing a vertex collapse operation on a mesh, according to one embodiment of the present invention.
Figure 11A:
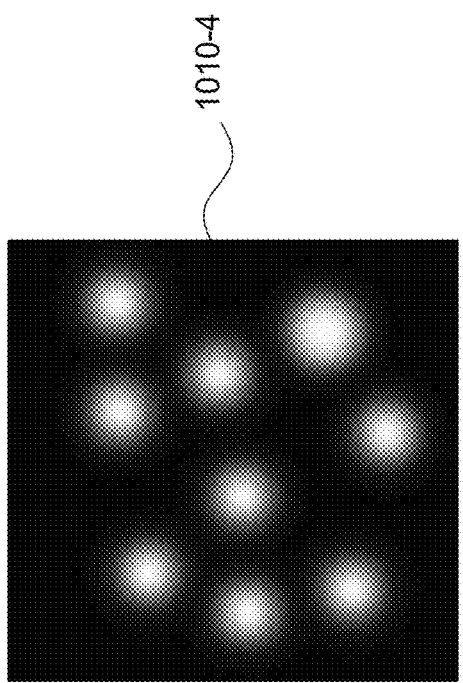
FIGS. 11A-11D illustrate a weight refinement mask that is applied to a mesh over several steps, according to one embodiment of the present invention.
Figure 11D:
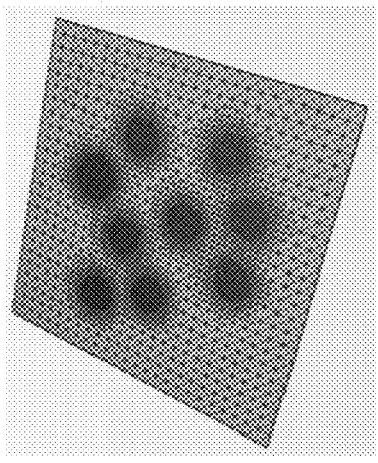
Figure 11C:
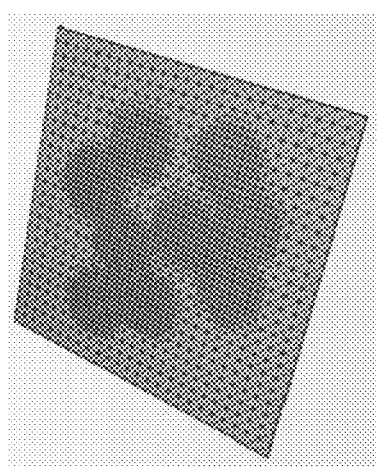
Figure 11B:
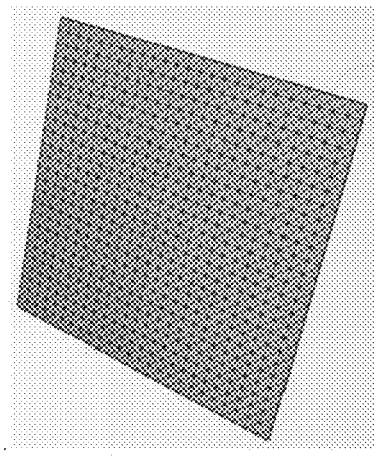

FIG. 9 is a flow diagram of method steps for performing a vertex collapse operation 300 on a mesh, according to one embodiment of the present invention. Although the method steps are described in conjunction with the system of FIG. 1, persons skilled in the art will understand that any system configured to perform the method steps, in any order, falls within the scope of the present invention.

As shown, a method 900 begins at step 910, where the mesh refinement engine 150 identifies a triangle vertex 315 included in a mesh. At step 920, the mesh refinement engine 150 optionally determines whether the vertex 315 is on a preserved boundary of the mesh. If the vertex 315 is located on a preserved boundary (e.g., an ROI boundary, perimeter of the mesh, etc.), then the mesh refinement engine 150 determines not to collapse the vertex 315 at step 965. If the vertex 315 is not located on a preserved boundary, then the mesh refinement engine 150 determines whether the vertex 315 has a valence equal to three (i.e., the vertex 315 is connected to only three neighboring vertices 316) at step 930. If the vertex 315 does not have a valence equal to three, then the vertex 315 is not collapsed.

If the vertex 315 has a valence equal to three, then the mesh refinement engine 150 optionally determines whether all triangles connected to the vertex 315 are located within the ROI at step 940. If all triangles connected to the vertex 315 are not located within the ROI, then the vertex 315 is not collapsed. If all triangles connected to the vertex 315 are located within the ROI, then the mesh refinement engine 150 next determines whether a neighboring vertex 316 has a valence higher than three at step 950. If no neighboring vertex 316 has a valence higher than three, then the vertex 315 is not collapsed. If a neighboring vertex 316 has a valence higher than three, then the vertex 315 is collapsed and a new triangle 221 is added to the mesh at step 960. Finally, at step 970, the mesh refinement engine 150 determines whether to process another vertex 315 included in the mesh. If another vertex 315 is to be processed by the mesh refinement engine 150, then the method returns to step 910, where another vertex 315 included in the mesh is identified.

The mesh refinement operations described above may be performed on a mesh in a weighted manner. That is, a weight function may be applied to vary the conditions (e.g., threshold values) under which edge operations and/or vertex operation are performed. For example, with respect to the edge split operation 204 and edge collapse operation 206 described above, the weighting applied to the length of an edge 210 at step 730 and step 830, respectively, may be based on a weight function generated by the mesh refinement engine 150 and/or specified by the user. Exemplary weight functions are described below with respect to FIGS. 10A-10F.

FIGS. 10A-10F illustrate refinement weight masks 1010 and mesh refinements performed using the refinement weight masks 1010, according to one embodiment of the present invention. As shown, a refinement weight mask 1010 may include a two-dimensional function specified by a grayscale image mapped to the range [0,1], with black representing 0 and white representing 1. For example, the refinement weight mask 1010-1 shown in FIG. 10A includes a white rectangular region representing a weighted value of 1 and black border region representing a weighted value of 0. Accordingly, when a mesh refinement operation (e.g., an edge split operation 204) is performed using the refinement weight mask 1010-1, the length of an edge 210 may be weighted with a value of 1.0 (e.g., at step 730) when refining an area of the mesh to which the white rectangular region is mapped. In addition, the length of an edge 210 may be weighted with a value of zero when refining an area of the mesh to which the black border region is mapped. A weighting value of zero may indicate that the mesh refinement operation(s) are not to be performed in the relevant area(s) of the mesh. Thus, as shown in FIG. 10D, refined mesh areas 1020, to which the white rectangular region was mapped, include a higher triangle density than unrefined areas 1025, to which the black border region was mapped.

Another example of a weight refinement mask 1010-3 is shown in FIG. 10C. In contrast to weight refinement mask 1010-1, weight refinement mask 1010-3 includes a circular gradient of grayscale values (as opposed to a circular white region associated with weight refinement mask 1010-2 of FIG. 10B). Consequently, a mesh refinement operation (e.g., an edge split operation 204) performed using refinement weight mask 1010-3 may result in a graded mesh area 1022, to which grayscale values between black and white (e.g., 0.3, 0.5, 0.7, etc.) have been mapped. Because the edge split operation 204 halves edge lengths, transitions (e.g., graded mesh areas 1022) between refined mesh areas 1020 and unrefined mesh regions 1025 may exhibit quasi-discrete "steps" in triangle density. This stepping effect can be mitigated by performing a smoothing operation 400, as described with respect to FIG. 12.

In addition to the weight refinement masks 1010 described above, a weight function used to perform mesh refinement operations may be defined by a scalar function over three-dimensional space or by a scalar function over UV space. In the latter case, each vertex in the ROI may be assigned a UV parameter. In other implementations, the weight function may be specified by a discrete function defined at one or more vertices, edges, and/or faces of the mesh. In still other implementations, the weight refinement masks 1010 described above may represent parameters of a brush tool. For example, a user may position weight refinement mask 1010-3 over various regions of a mesh to perform mesh refinement operations on those regions.

Furthermore, weight functions (e.g., weight refinement masks, scalar functions, discrete functions, etc.) may be applied in a stepwise manner to refine a mesh. An example of stepwise mesh refinement iterations is shown in FIGS. 11A-11D, which illustrate a weight refinement mask that is applied to a mesh over several steps, according to one embodiment of the present invention. As shown, the weight refinement mask 1010-4 is applied in a first step (FIG. 11C) and a second step (FIG. 11D) to refine the mesh. Each iteration increases the triangle density of mesh regions to which non-zero weight values (e.g., non-black values) are mapped. Furthermore, stepwise mesh refinement techniques may be implemented using a brush tool. For example, a user may position a weight refinement mask (e.g., 1010-3) over one or more overlapping or non-overlapping regions of a mesh and perform mesh refinement operations on those regions in a stepwise manner. Although FIGS. 10D-10F and 11B-11D illustrate using weight functions to refine a mesh by increasing mesh triangle density, weight functions also may be used to refine a mesh by decreasing triangle density (e.g., by performing edge collapse and/or vertex collapse operations).

Figure 12:
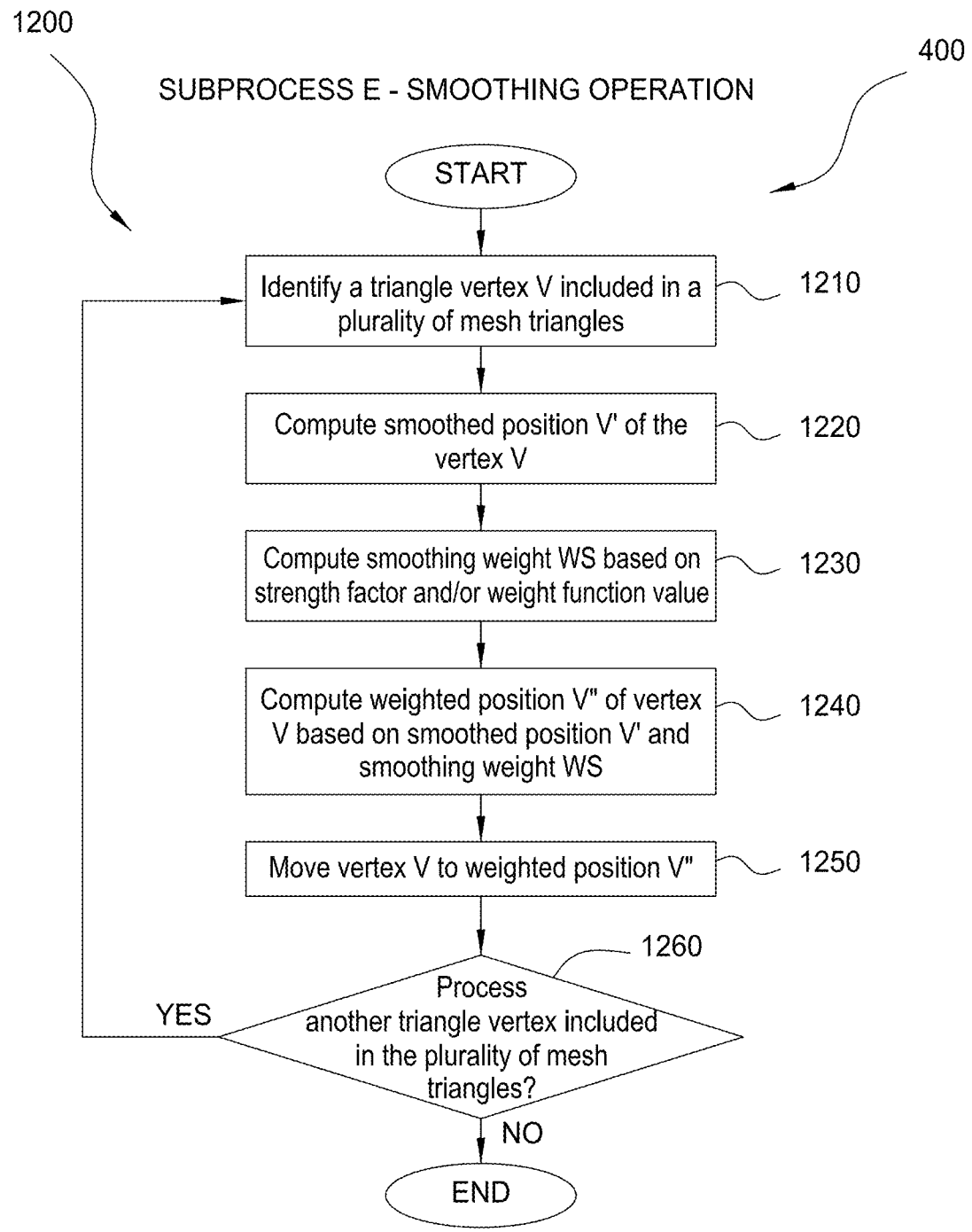
FIG. 12 is a flow diagram of method steps for performing a smoothing operation on mesh, according to one embodiment of the present invention.

FIG. 12 is a flow diagram of method steps for performing a smoothing operation 400 on a mesh, according to one embodiment of the present invention. Although the method steps are described in conjunction with the system of FIG. 1, persons skilled in the art will understand that any system configured to perform the method steps, in any order, falls within the scope of the present invention.

As shown, a method 1200 begins at step 1210, where the mesh refinement engine 150 identifies a triangle vertex 415 included in a mesh. At step 1220, the mesh refinement engine 150 determines a smoothed vertex position 416. The smoothed vertex position 416 may be determined using a smoothing algorithm, such as a uniform Laplacian smoothing algorithm. At step 1230, a smoothing weight may be determined based on a strength factor and/or a weight function value. The strength factor may be a user-defined value (e.g., a brush tool parameter in application 140). The weight function value may be based on a weight mask generated by the mesh refinement engine 150 or defined by the user. The use of weight functions and weight masks is described in further detail with respect to FIGS. 13A and 13B.

Next, at step 1240, a weighted vertex position is determined based on the smoothed vertex position 416 and (optionally) based on the smoothing weight determined in step 1230. For example, the weighted vertex position may be computed by interpolating the initial vertex position 415 and the smoothed vertex position 416 or by performing linear blending using the initial vertex position 415 (V), the smoothed vertex position 416 (V'), and the smoothing weight (WS). An exemplary formula for performing linear blending to determine a weighted vertex position (V") is provided in Equation 1, below.

$$V''=(1-WS) \times V+(WS) \times V' \qquad \text{(Eq. 1)}$$

Next, at step 1250, the vertex V is moved to the weighted position V" just computed. Finally, at step 1260, the method determines whether another triangle vertex included in the plurality of mesh triangles should be processed. If yes, the method returns to step 1210 to begin processing the new triangle vertex.

Figure 13A:
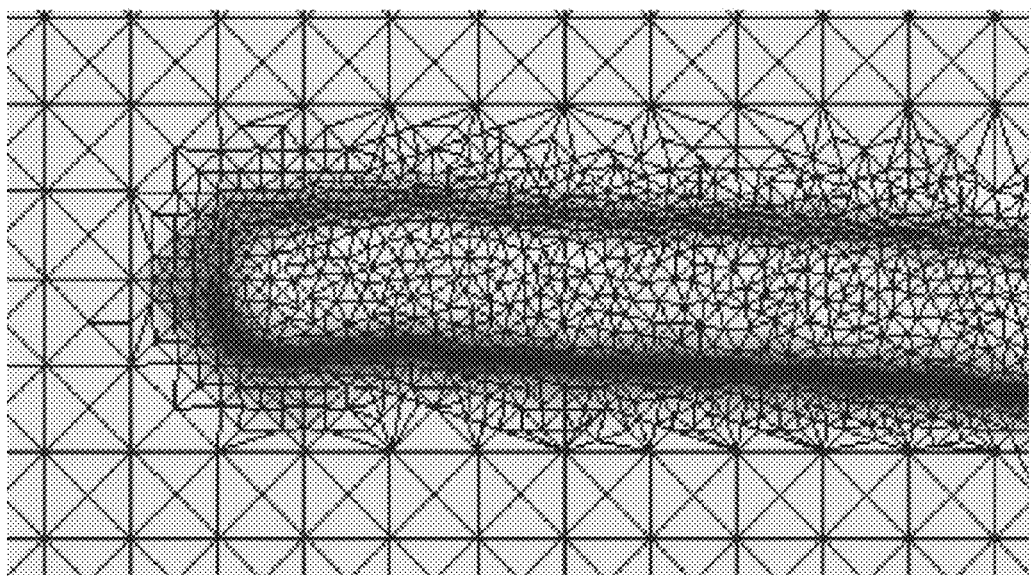
FIGS. 13A and 13B illustrate a displaced mesh region on which refinement operations were performed without smoothing and a displaced mesh region on which refinement operations were performed with smoothing, respectively, according to one embodiment of the present invention.
Figure 13B:
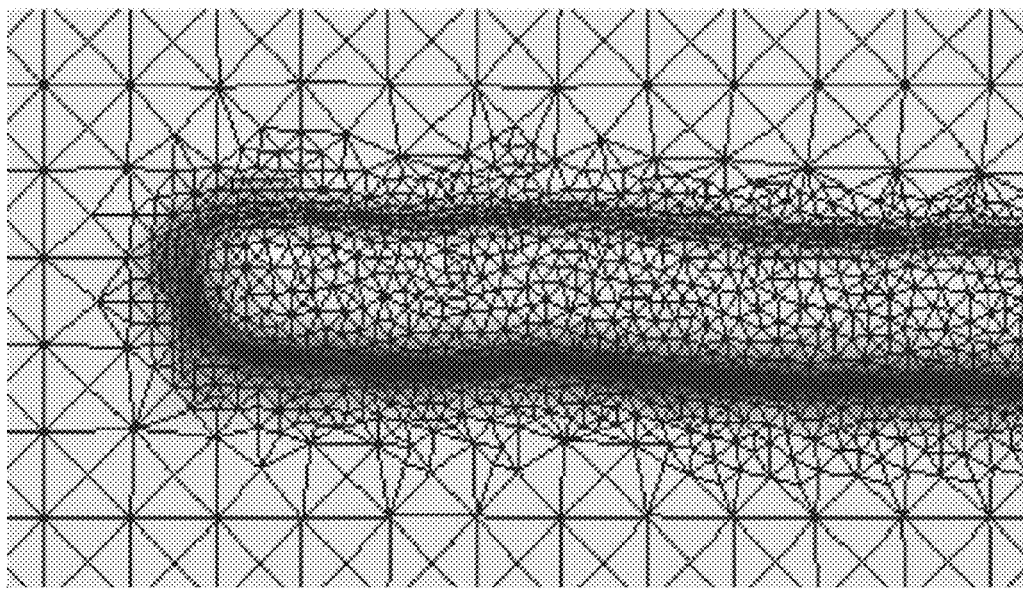

FIGS. 13A and 13B illustrate a displaced mesh region on which refinement operations were performed without smoothing and a displaced mesh region on which refinement operations were performed with smoothing, respectively, according to one embodiment of the present invention. As shown in FIG. 13A, without performing a smoothing operation, many small, high-valence vertices remain along the borders of the displaced region. Because these vertices are positioned on a ROI, they are not modified during mesh refinement operations and instead act as a barrier to mesh refinement, resulting in various artifacts. However, as shown in FIG. 13B, performing one or more smoothing passes redistributes vertices and enables the refinement to extend outside the ROI boundary edges.

As described above, a smoothing operation 400 may be based on a smoothing weight, which controls the degree to which smoothing is applied to the mesh. The smoothing weight may be based on a function, such as the weight functions described above with respect to FIGS. 10A-10F and 11A-11D. A simple weight function returns a value of 1.0, which results in uniform smoothing. However, uniform smoothing can be problematic. In one example, applying uniform smoothing to the displaced region shown in FIGS. 13A and 13B may cancel out or damp some amount of the displacement. To avoid canceling out a previous modification performed on the mesh, the weight function with which the smoothing operation 400 is performed may be based on characteristics of a region of the mesh on which the smoothing operation is to be performed. For example, the weight function used during smoothing may be based on an inverse function of the application tool (e.g., brush tool, displacement tool, stamp tool, etc.) that was used to modify the mesh (e.g., to displace the mesh). Thus, if a stamp tool was used to displace a region of the mesh, then the weight function may be based on an inverse profile of the stamp tool.

Figures 14A, 14B, 14C:
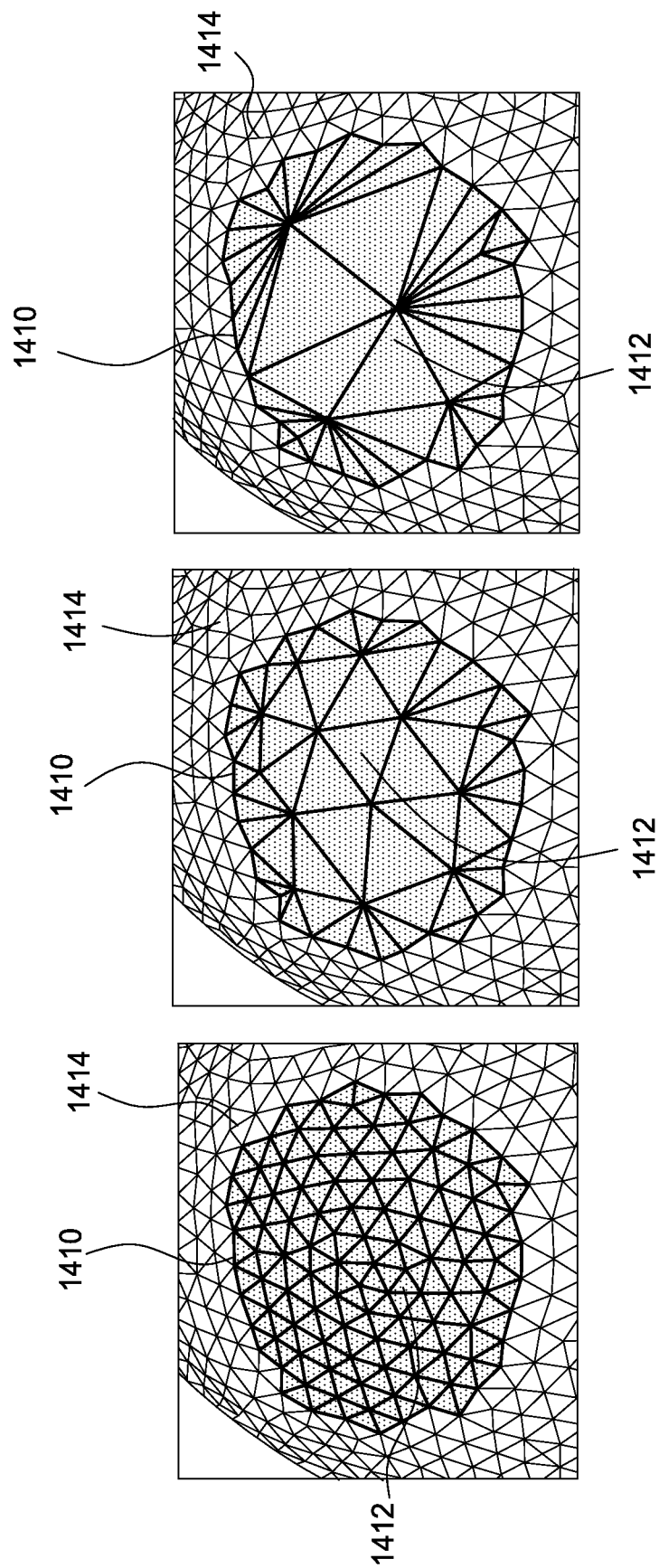
FIGS. 14A-14C illustrate mesh refinement operations performed within a preserved boundary, according to one embodiment of the present invention.

FIGS. 14A-14C illustrate mesh refinement operations performed within a preserved boundary 1410, according to one embodiment of the present invention. As shown, during each mesh refinement pass, mesh regions 1412 located within the preserved boundary 1410 are modified (e.g., via edge collapse and/or vertex collapse operations). However, mesh regions 1414 outside of the preserved boundary 1410 remain unchanged.

Figure 15B:
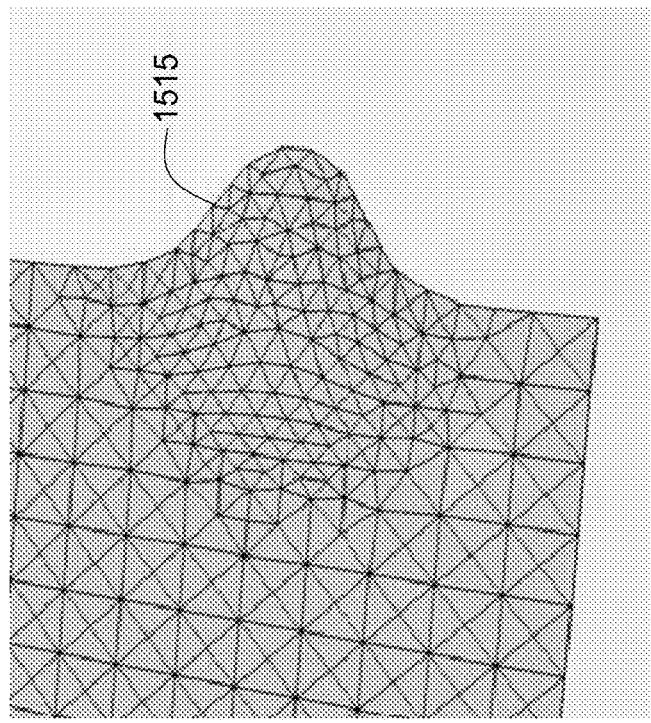
FIGS. 15A and 15B illustrate mesh refinement operations performed on a non-preserved boundary, according to one embodiment of the present invention.
Figure 15A:
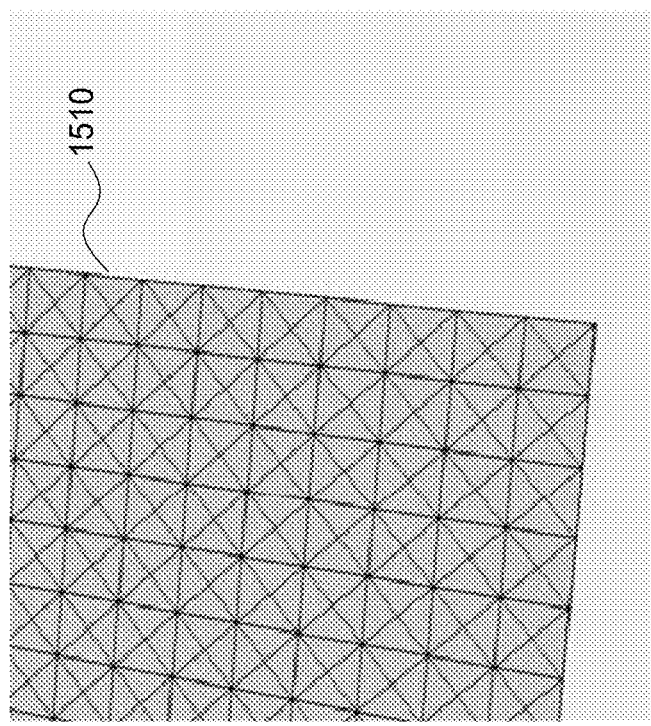

FIGS. 15A and 15B illustrate mesh refinement operations performed on a non-preserved boundary 1510, according to one embodiment of the present invention. As shown, during each mesh refinement pass, mesh regions located on the non-preserved boundary 1510 are modified (e.g., via edge split operations), causing the size and shape of the mesh boundary 1515 (e.g., the outer perimeter of the mesh) to change. Thus, as shown, mesh refinement operations may be performed on a non-preserved boundary 1510 to change the shape of the boundary, add edges and/or vertices to the boundary, and/or modify triangles inside and/or outside of the boundary.

In sum, a mesh refinement engine receives multiple triangles associated with a triangle mesh. The mesh refinement engine then performs one or more edge operation passes on the mesh, including an edge flip pass, an edge split pass, and/or an edge collapse pass. The mesh refinement engine also may perform one or more vertex collapse passes and/or smoothing passes on the mesh. The edge operation passes, vertex collapse passes, and smoothing passes may be applied locally to the mesh via a brush tool. In some implementations, these different passes may be based on a weighting function provided to the mesh refinement engine.

One advantage of the techniques described herein is that a user is able to iteratively refine a triangle mesh via a brush tool or a weighting function. Further, each refinement pass can be applied locally to one or more regions of the mesh at the discretion of the user. Consequently, a user is able to more efficiently repair mesh irregularities, thereby reducing the incidence of computational issues and/or visual artifacts during subsequent processing of the mesh.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for refining a mesh of primitives, the method comprising:
   receiving a mesh that includes a plurality of triangles; and
   processing the mesh to generate a refined mesh by:
      performing an edge flip operation on the mesh with respect to a first edge of the mesh, wherein the first edge is selected based on a first distance from a first midpoint associated with the first edge to a second midpoint associated with the first edge being not greater than a midpoint threshold value;
      performing an edge split operation on the mesh; and
      performing an edge collapse operation on the mesh, wherein at least one of the edge flip operation, the edge split operation, and the edge collapse operation is performed based on determining that at least one vertex included in the mesh is not associated with a preserved boundary of the mesh.

2. The method of claim 1, further comprising performing a vertex collapse operation by:
   selecting a vertex associated with a triangle included in the mesh;
   determining that a first condition exists wherein the vertex is not associated with a preserved boundary of the mesh;
   determining that a second condition exists wherein the vertex has a first valence value of three;
   determining that a third condition exists wherein an adjacent vertex has a second valence value greater than three; and
   collapsing the vertex upon determining that the first condition, the second condition, and the third condition exist.

3. The method of claim 1, wherein at least one of the edge flip operation, the edge split operation, and the edge collapse operation is based on a weight function.

4. The method of claim 3, wherein the weight function comprises a bitmap associated with the mesh, and the triangle is associated with one or more values included in the bitmap.

5. The method of claim 1, wherein the edge flip operation comprises:
   determining that a first condition exists wherein the first edge is not associated with a preserved boundary;
   determining that a second condition exists wherein a length of the first edge is not greater than a first threshold value;
   determining that a fourth condition exists wherein the first edge is not a non-manifold edge, wherein the fourth condition specifies that the first edge abut only one triangle from the plurality of triangles; and
   flipping the first edge upon determining that the first condition, the second condition, the third condition, and the fourth condition exist.

6. The method of claim 1, wherein the edge split operation comprises:
   determining that a first condition exists wherein a second edge is not associated with a preserved boundary;
   determining that a second condition exists wherein a length of the second edge is greater than a first threshold value; and splitting the second edge upon determining that the first condition and the second condition exist.

7. The method of claim 1, wherein the edge collapse operation comprises:
   determining that a first condition exists wherein a second edge is not associated with a preserved boundary;
   determining that a second condition exists wherein the length of the second edge is less than a first threshold value or a minimum opposing angle of an adjacent triangle connected to the second edge is less than a second threshold value;
   determining that a third condition exists wherein collapsing the second edge does not generate a non-manifold edge; and
   collapsing the second edge upon determining that the first condition, the second condition, and the third condition exist.

8. The method of claim 1, further comprising performing a smoothing operation on the triangle by:
   selecting a vertex associated with the triangle;
   applying a smoothing algorithm to the vertex to determine a first vertex position;
   determining a second vertex position based on the first vertex position and a smoothing strength value; and
   moving the vertex to the second vertex position.

9. The method of claim 8, wherein the smoothing algorithm comprises a Laplacian smoothing algorithm, and the second vertex position is determined by performing a linear blending operation based on the first vertex position and a starting position of the vertex.

10. A non-transitory computer-readable storage medium including instructions that, when executed by a processing unit, cause the processing unit to refine a mesh of primitives, by performing the steps of:
    receiving a mesh that includes a plurality of triangles; and
    processing the mesh to generate a refined mesh by:
      performing an edge flip operation on the mesh with respect to a first edge of the mesh, wherein the first edge is selected based on a first distance from a first midpoint associated with the first edge to a second midpoint associated with the first edge being not greater than a midpoint threshold value;
      performing an edge split operation on the mesh; and
      performing an edge collapse operation on the mesh, wherein at least one of the edge flip operation, the edge split operation, and the edge collapse operation is performed based on determining that at least one vertex included in the mesh is not associated with a preserved boundary of the mesh.

11. The non-transitory computer-readable storage medium of claim 10, further comprising performing a vertex collapse operation by:
    selecting a vertex associated with a triangle included in the mesh;
    determining that a first condition exists wherein the vertex is not associated with a preserved boundary of the mesh;
    determining that a second condition exists wherein the vertex has a first valence value of three;
    determining that a third condition exists wherein an adjacent vertex has a second valence value greater than three; and
    collapsing the vertex upon determining that the first condition, the second condition, and the third condition exist.

12. The non-transitory computer-readable storage medium of claim 10, wherein at least one of the edge flip operation, the edge split operation, and the edge collapse operation is based on a weight function.

13. The non-transitory computer-readable storage medium of claim 12, wherein the weight function comprises a bitmap associated with the mesh, and the triangle is associated with one or more values included in the bitmap.

14. The non-transitory computer-readable storage medium of claim 10, wherein the edge flip operation comprises:
    determining that a first condition exists wherein the first edge is not associated with a preserved boundary;
    determining that a second condition exists wherein a length of the first edge is not greater than a first threshold value;
    determining that a fourth condition exists wherein the first edge is not a non-manifold edge; and
    flipping the first edge upon determining that the first condition, the second condition, the third condition, and the fourth condition exist.

15. The non-transitory computer-readable storage medium of claim 10, wherein the edge split operation comprises:
    determining that a first condition exists wherein a second edge is not associated with a preserved boundary;
    determining that a second condition exists wherein a length of the second edge is greater than a first threshold value; and
    splitting the second edge upon determining that the first condition and the second condition exist.

16. The non-transitory computer-readable storage medium of claim 10, wherein the edge collapse operation comprises:
    determining that a first condition exists wherein a second edge is not associated with a preserved boundary;
    determining that a second condition exists wherein the length of the second edge is less than a first threshold value or a minimum opposing angle of an adjacent triangle connected to the second edge is less than a second threshold value;
    determining that a third condition exists wherein collapsing the second edge does not generate a non-manifold edge; and
    collapsing the second edge upon determining that the first condition, the second condition, and the third condition exist.

17. The non-transitory computer-readable storage medium of claim 10, further comprising performing a smoothing operation on the triangle by:
    selecting a vertex associated with the triangle;
    applying a smoothing algorithm to the vertex to determine a first vertex position;
    determining a second vertex position based on the first vertex position and a smoothing strength value; and
    moving the vertex to the second vertex position.

18. The non-transitory computer-readable storage medium of claim 17, wherein the smoothing algorithm comprises a Laplacian smoothing algorithm, and the second vertex position is determined by performing a linear blending operation based on the first vertex position and a starting position of the vertex.

19. The non-transitory computer-readable storage medium of claim 10, wherein the preserved boundary comprises a closed geometric shape.

20. The non-transitory computer-readable storage medium of claim 10, further comprising receiving the preserved boundary via one or more user selections.

21. A computing device, comprising:

a memory; and a processing unit coupled to the memory and configured to refine a mesh of primitives by:
   receiving a mesh that includes a plurality of triangles; and
   processing the mesh to generate a refined mesh by:
      performing an edge flip operation on the mesh with respect to a first edge of the mesh, wherein the first edge is selected based on a first distance from a first midpoint associated with the first edge to a second midpoint associated with the first edge being not greater than a midpoint threshold value;
      performing an edge split operation on the mesh; and
      performing an edge collapse operation on the mesh, wherein at least one of the edge flip operation, the edge split operation, and the edge collapse operation is performed based on determining that at least one vertex included in the mesh is not associated with a preserved boundary of the mesh.

22. The computing device of claim 21, wherein the processing unit is further configured to perform a vertex collapse operation by:
   selecting a vertex associated with a triangle included in the mesh;
   determining that a first condition exists wherein the vertex is not associated with a preserved boundary of the mesh;
   determining that a second condition exists wherein the vertex has a first valence value of three;
   determining that a third condition exists wherein an adjacent vertex has a second valence value greater than three; and
   collapsing the vertex upon determining that the first condition, the second condition, and the third condition exist.

* * * * *